US009550922B2

(12) United States Patent
Tomatsu et al.

(10) Patent No.: US 9,550,922 B2
(45) Date of Patent: *Jan. 24, 2017

(54) HOT-MELT ADHESIVE FOR ELECTRIC INSTRUMENTS

(71) Applicant: HENKEL AG & CO. KGAA, Duesseldorf (DE)

(72) Inventors: Itsuro Tomatsu, Osaka (JP); Kenji Matsuda, Osaka (JP); Ai Takamori, Osaka (JP)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,359

(22) Filed: Oct. 24, 2014

(65) Prior Publication Data

US 2015/0045509 A1 Feb. 12, 2015

Related U.S. Application Data

(63) Continuation of application No. PCT/JP2013/062804, filed on Apr. 25, 2013.

(30) Foreign Application Priority Data

Apr. 27, 2012 (JP) ................................. 2012-103440

(51) Int. Cl.
*C09J 123/12* (2006.01)
*C09J 123/26* (2006.01)
*H01L 31/048* (2014.01)
*C09J 153/00* (2006.01)
*C09J 151/06* (2006.01)
*H01M 2/08* (2006.01)

(52) U.S. Cl.
CPC ............. *C09J 123/26* (2013.01); *C09J 123/12* (2013.01); *C09J 151/06* (2013.01); *C09J 153/00* (2013.01); *H01M 2/08* (2013.01); *C09J 2203/33* (2013.01)

(58) Field of Classification Search
None
See application file for complete search history.

(56) References Cited

U.S. PATENT DOCUMENTS

| 5,604,033 A | 2/1997 | Arthurs et al. | |
|---|---|---|---|
| 5,994,474 A | 11/1999 | Wey et al. | |
| 2001/0007001 A1 | 7/2001 | Rodriguez et al. | |
| 2003/0162882 A1* | 8/2003 | Grimm et al. | 524/493 |
| 2004/0216778 A1* | 11/2004 | Ferri et al. | 136/251 |
| 2008/0302417 A1* | 12/2008 | Inoue et al. | 136/256 |
| 2010/0206477 A1 | 8/2010 | Stammer et al. | |
| 2011/0046290 A1* | 2/2011 | Toyoda et al. | 524/525 |
| 2011/0060078 A1 | 3/2011 | Becker et al. | |
| 2013/0209036 A1 | 8/2013 | Morita et al. | |

FOREIGN PATENT DOCUMENTS

| CN | 1841786 A | | 10/2006 |
|---|---|---|---|
| EP | 0758029 | * | 12/1997 |
| EP | 1209094 A1 | | 5/2002 |
| JP | 63244552 A | | 10/1988 |
| JP | 8106884 A | | 4/1996 |
| JP | 2000144074 | | 5/2000 |
| JP | 2007048504 A | | 2/2007 |
| JP | 201152049 A | | 3/2011 |
| JP | 201160501 A | | 3/2011 |
| JP | 2012103435 | | 5/2012 |
| WO | 8911513 A1 | | 11/1989 |

* cited by examiner

*Primary Examiner* — Jeffrey Mullis
(74) *Attorney, Agent, or Firm* — Sun Hee Lehmann

(57) ABSTRACT

There are provided a hot-melt adhesive, which is excellent in solvent resistance and is excellent in adhesion to an adherend (specifically, a polyimide film) containing an electrolytic solution of a battery therein, and also can contribute to an improvement in performances of electric instruments; and an electric instrument produced by using such hot-melt adhesive. A hot-melt adhesive for electric instruments, comprising an olefin based modified polymer (A), the olefin based modified polymer (A) being a modified polymer having a functional group containing silicon, is excellent in resistance to an electrolytic solution of a battery (that is, electrolytic solution resistance or solvent resistance), and also exhibits improved adhesion of the hot-melt adhesive to an adherend (plastic film such as a polyimide film) containing the electrolytic solution therein.

8 Claims, 1 Drawing Sheet

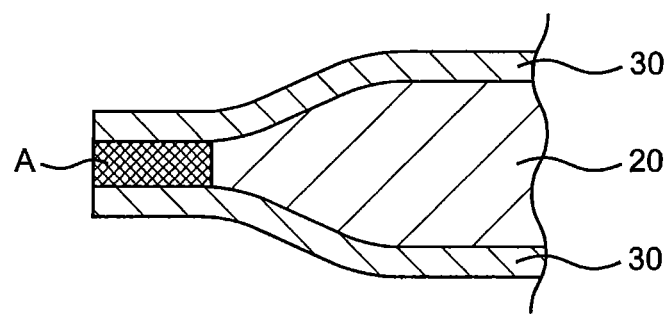

HOT-MELT ADHESIVE FOR ELECTRIC INSTRUMENTS

TECHNICAL FIELD OF THE INVENTION

The present invention relates to a hot-melt adhesive which is used for electric instruments. As used herein, the "electric instrument" means an instrument which converts another energy into electric energy (electricity), an instrument which converts electric energy into another energy, and an instrument which stores electric energy as electric energy or another energy. Specific examples of the electric instrument include chemical batteries such as an alkali dry battery and a lithium ion battery; and, physical batteries such as a solar battery and a capacitor.

BACKGROUND OF THE INVENTION

Electric instruments are used in the field of electronics, and automobile applications, in various forms such as a primary battery, a secondary battery, and a capacitor. Particularly, a lithium ion battery, which is a type of non-aqueous electrolyte battery, is widely used as a power supply of mobile instruments such as a mobile phone and a notebook-type personal computer because of its properties such as its high energy density. Secondary batteries capable of being recharged, are increasing in importance due to consideration for environmental problems, and thus research has been conducted into the application of such secondary batteries to automobiles, electric chairs, and home/business power storage systems, in addition to the mobile instruments.

When producing an electric instrument such as a lithium battery, it is required to use an adhesive having excellent insulating properties and heat resistance taking electrical short circuit or thermal ignition into consideration.

JP 2011-052049 A discloses that a hot-melt adhesive including a copolymer of ethylene with a carboxylic acid derivative having an ethylenic double bond, a polypropylene wax, a polyethylene wax, and a Fischer-Tropsch wax is suited for electric instruments (see JP 2011-052049 A, Claim 1 and Examples). A trial is made on an improvement in insulating properties of the electric instruments by coating an electrode and a separator with the hot-melt adhesive of the same document (see JP 2011-052049 A, [0055] and [0069] to [0072]).

An examination has recently been made on the use of a light-weight and thin laminated film, which is obtained by laminating a metal foil such as an aluminum foil on a pair of insulating resin films thereby integrating them, as an external container, so as to improve the energy density of this kind of battery. An external container obtained by forming a laminated film into a bag or tray shape is used as a container for lithium secondary batteries such as a lithium ion battery and a lithium polymer battery, and a capacitor.

The lithium ion battery is produced by laminating a positive electrode material, a negative electrode material, and a separator to each other; inserting the obtained laminate into an external container; filling the external container with an electrolytic solution; inserting a positive electrode lead and a negative electrode lead; and sealing the container.

The lithium polymer battery is produced by inserting a battery body into an external container, which battery body is obtained by laminating a positive electrode material, a negative electrode material, and a polymer electrolyte layer permeated with an electrolytic solution; inserting a positive electrode lead and a negative electrode lead so that one end is located at each electrode material and the other end is located outside the container; and finally sealing the container.

The capacitor is produced by inserting a laminate into an external container, which laminate is obtained by interposing an electrode of activated carbon permeated with an electrolytic solution and a separator between current collectors of aluminum; and sealing the container in a state where one end of the current collector is extruded out of the container.

As shown in FIG. 1, an external container is produced by forming an adherend 30 made of a resin film such as a polyimide film into a bag shape, and the container is filled with an electrolytic solution 20. The adherend 30 is sealed with an adhesive A so that the electrolytic solution 20 does not leak from the container.

Various examples have been reported on external containers of batteries.

JP 2011-060501 A discloses a packing material for a lithium ion battery, that is, an external container. The same document discloses, as an adhesive resin layer composing the packing material, a mixed resin of a maleic anhydride modified polypropylene resin and a maleic anhydride modified styrene based elastomer resin (see JP 2011-060501 A, [0041]). The document also teaches that the maleic anhydride modified polypropylene resin, having a specific Vicat softening point, is likely to prevent a decrease in adhesion force in the event of using a hot-melt type adhesive (see JP 2011-060501 A, [0025]). It is necessary for the packing material of the same document to include a lot of layers such as a base material layer, an adhesive layer, an aluminum foil layer, a chemically treated layer, and a sealant layer in addition to the adhesive resin layer (see JP 2011-060501 A, FIG. 1).

The packing material for a lithium ion battery of such multilayered films contains an electrolytic solution, and is therefore sealed so as not to leak the material contained therein (see JP 2011-060501 A, [0004]). One of sealing means includes a method in which the end of the packing material 30 is heat-sealed with the hot meltadhesive A, as shown in FIG. 1. However, an adhesive having no resistance to the electrolytic solution 20 is likely to cause swelling, and thus fails to obtain sufficient adhesion.

JP 8-106884 A discloses a film for sealing material of a thin battery, and also discloses that a modified polyolefin is used as a material of a hot-melt adhesive polyolefin layer (see JP 8-106884 A, [0015] and [0028]). As is apparent from Examples of the same document, electrolytic solution resistance is improved to some extent (see JP 8-106884 A, [0062] and [0065]), but it is difficult to say that the electrolytic solution resistance sufficiently meets the high-level requirements of users in recent days.

Furthermore, no study has been made on adhesion with a polyimide film having excellent electrolytic solution resistance (solvent resistance) which has been used more often than before in recent years. From this point of view, it is impossible to say that the adhesives of JP 2011-052049 A, JP 2011-060501 A, and JP 8-106884 A have sufficient performances.

SUMMARY OF THE INVENTION

The present invention has been made so as to achieve the above object, and an object of the present invention is to provide a hot-melt adhesive, which is excellent in solvent resistance and is excellent in adhesion (or adhesive property) to an adherend (specifically, a polyimide film) containing an electrolytic solution of a battery therein, and which can also contribute to an improvement in performances of electric instruments. Another object of the present invention is to provide an electric instrument produced by using such hot-melt adhesive.

The present inventors have intensively studied and found that, surprisingly, it is possible to solve the above problems by imparting a specific functional group to a polyolefin, thus completing the present invention.

That is, the present invention provides, in an aspect, a hot-melt adhesive for electric instruments, comprising an olefin based modified polymer (A), wherein the olefin based modified polymer (A) has a functional group containing silicon.

The present invention provides, in an embodiment, the hot-melt adhesive for electric instruments, wherein the olefin based modified polymer (A) has an alkoxysilyl group.

The present invention provides, in another embodiment, the hot-melt adhesive for electric instruments, wherein the olefin based modified polymer (A) includes a modified polymer based on a copolymer of ethylene with the other olefin.

The present invention further provides, as a preferred embodiment, the hot-melt adhesive for electric instruments, which further comprises a polyolefin (B).

The present invention provides, as another aspect, an electric instrument obtainable by using the above hot-melt adhesive for electric instruments.

The hot-melt adhesive for electric instruments according to the present invention comprises an olefin based modified polymer (A), and the olefin based modified polymer (A) has a functional group containing silicon. Therefore, the hot-melt adhesive is excellent in resistance to an electrolytic solution of a battery (that is, has electrolytic solution resistance or solvent resistance), and also adhesion to an adherend (plastic film such as a polyimide film) containing an electrolytic solution therein is improved.

In the hot-melt adhesive for electric instruments of the present invention, when the olefin based modified polymer (A) is a modified polymer having an alkoxysilyl group, the resistance to an electrolytic solution is more improved and also the adhesion to an adherend is more improved.

In the hot-melt adhesive for electric instruments of the present invention, when the olefin based modified polymer (A) includes a modified polymer based on a copolymer of ethylene with the other olefin, the adhesion to an adherend is more excellent.

When the hot-melt adhesive for electric instruments according to the present invention further comprises a polyolefin (B), the adhesion to an adherend is more improved.

The electric instrument of the present invention is obtainable by using the above hot-melt adhesive for electric instruments. Therefore, the electrolytic solution contained in the adherend does not cause swelling of the hot-melt adhesive and the hot-melt adhesive has an excellent adhesion force, and thus peeling of the adherend does not occur.

BRIEF DESCRIPTION OF THE DRAWING

FIG. 1 is a cross section of the external container of a battery.

DETAILED DESCRIPTION OF THE INVENTION

The hot-melt adhesive for electric instruments according to the present invention includes an olefin based modified polymer (A). The olefin based modified polymer (A) is a modified polyolefin having a functional group containing silicon (that is, an olefin based silicon modified polymer), and the polyolefin based polymer is modified by imparting a functional group containing silicon.

As used herein, "hot-melt adhesive" refers to an adhesive which is solid at normal temperature and exhibits fluidity by heating, and also can be applied to objects, for example, a core material and an adherend, and is solidified by cooling again, thus adhering to the objects.

In the present invention, there is no particular limitation on the olefin based modified polymer (A) as long as it is a modified polyolefin having a functional group containing silicon (olefin based silicon modified polymer) and the objective hot-melt adhesive for electric instruments of the present invention can be obtained.

In the present invention, there is no particular limitation on the method for producing the olefin based modified polymer (A) if the functional group containing silicon is imparted to the polyolefin, as long as the objective hot-melt adhesive for electric instruments of the present invention can be obtained. Such a production method includes, for example, a method (i) in which a polyolefin is produced first, and then a functional group containing silicon is imparted to the polyolefin; and a method (ii) in which a monomer having a functional group containing silicon is copolymerized while producing a polyolefin by polymerizing an olefin monomer and, at the same time, a functional group containing silicon is imparted to the polyolefin.

The polyolefin includes, for example, homopolymers of an olefin, such as polyethylene, polypropylene, polybutene, polyoctene, and polyisobutylene, "copolymers of ethylene with the other olefin", and "copolymers of other olefins".

Specific examples of the "other olefin" include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene. The other olefin is preferably an olefin having 3 to 10 carbon atoms, more preferably propylene, butene, and octene, and particularly preferably butene and propylene.

The "copolymer of ethylene with the other olefin" includes, for example, a copolymer of ethylene with octene, a copolymer of ethylene with propylene and butene, a copolymer of ethylene with propylene, and a copolymer of ethylene with butene. These copolymers may be used alone or in combination.

In the present invention, the copolymer of ethylene with the other olefin is most preferably a copolymer of ethylene with propylene and butene.

In the present invention, the functional group containing silicon (Si) includes, for example, at least one functional group selected from an alkoxysilyl group, a silanol group, and a silyl ether group. Among these groups, an alkoxysilyl group is particularly preferable. The alkoxysilyl group includes, for example, trimethoxysilyl group, triethoxysilyl group, and dimethoxymethylsilyl group, and trimethoxysilyl group is particularly preferable.

Melt viscosity at 190° C. of the olefin based modified polymer (A) is preferably from 100 to 20,000 mPa·s, more preferably from 500 to 17,000 mPa·s, and most preferably from 2,000 to 15,000 mPa·s.

The melt viscosity at 190° C. refers to the value measured by a Brookfield type viscometer. Specifically, the viscosity is measured using spindle No. 27 while maintaining the olefin based modified polymer (A) at 190° C. for 30 minutes.

In the present invention, a preferred embodiment of the olefin based modified polymer (A) includes an olefin based modified polymer having an alkoxysilyl group. The olefin based modified polymer is more preferably a modified polymer based on a copolymer of ethylene having an alkoxysilyl group with the other olefin, and particularly preferably a copolymer of a modified ethylene having an alkoxysilyl group with propylene and butene. As the copolymer of a modified ethylene having an alkoxysilyl group with propylene and butene, for example, VESTOPLAST EP2412 (trade name), VESTOPLAST EP2403 (trade name), and VESTOPLAST 206 (trade name) are conuercially available.

The hot-melt adhesive for electric instruments of the present invention preferably contains, in addition to the olefin based modified polymer (A), a polyolefin (B).

Herein, the polyolefin (B) may be a common polyolefin as long as the objective hot-melt adhesive for electric instruments of the present invention can be obtained, and is more preferably an elastomer (or a rubbery elastic material). The polyolefin (B) may be either a homopolymer of an olefin or a copolymer of an olefin. Specific examples thereof include polyethylene, polypropylene, polybutene, polypentene, polyhexene, polyheptene, polyoctene, polybutene, polyisobutylene, an ethylene-propylene copolymer, and an ethylene-butene copolymer, and a rubbery elastic material thereof is more preferable. Among these polyolefins, a polypropylene is particularly preferable.

Therefore, in the present invention, the polyolefin (B) is more preferably a thermoplastic elastomer, and preferably has a chemical structure derived from propylene (more specifically, a repeating unit based on propylene). When the polyolefin (B) is a thermoplastic elastomer having a chemical structure derived from propylene, the hot-melt adhesive of the present invention is less likely to protrude from an adherend 30 in case the hot-melt adhesive is melted by thermocompression bonding while maintaining solvent resistance and adhesion, so that adhesion of the hot-melt adhesive is further improved. Therefore, most preferred embodiment of the polyolefin (B) is a polypropylene elastomer in the present invention. The commercially available product of the polypropylene elastomer includes, for example, Vistamaxx 6202 (manufactured by Exxon Mobil Corporation).

The hot-melt adhesive for electric instruments according to the present invention may contain, in addition to the olefin based modified polymer (A) and the polyolefin (B), a "copolymer of ethylene with carboxylic acid derivative having an ethylenic double bond".

There is no particular limitation on the "copolymer of ethylene with a carboxylic acid derivative having an ethylenic double bond" as long as it is a "copolymer of ethylene with a carboxylic acid derivative having an ethylenic double bond" and the hot-melt adhesive for electric instruments according to the present invention can be obtained.

As used herein, the "carboxylic acid derivative having an ethylenic double bond" refers to a carboxylic acid derivative having a double bond between carbon atoms, and is capable of addition-polymerizing with ethylene. Specifically, it refers to "carboxylic acid having an ethylenic double bond", "carboxylic anhydride having an ethylenic double bond", and "carboxylic acid ester having an ethylenic double bond", herein.

There is no particular limitation on the "carboxylic acid having an ethylenic double bond" as long as it is a compound having an ethylenic double bond and a carboxyl group and the hot-melt adhesive of the present invention can be obtained. Specific examples thereof include oleic acid, linoleic acid, maleic acid, acrylic acid, and methacrylic acid.

There is no particular limitation on the "carboxylic anhydride having an ethylenic double bond" as long as it is a compound obtained by dehydration condensation of two carboxylic acids and the hot-melt adhesive of the present invention can be obtained. Specific examples thereof include fumaric anhydride and maleic anhydride.

The "carboxylic acid ester having an ethylenic double bond" includes, for example, an unsaturated fatty acid alkyl ester and a carboxylic acid unsaturated alkyl ester.

The "unsaturated fatty acid alkyl ester" includes, for example, (meth)acrylic acid esters such as methyl acrylate, butyl acrylate, 2-ethylhexyl acrylate, and methyl methacrylate, and the "carboxylic acid unsaturated alkyl ester" includes, for example, vinyl acetate and allyl acetate.

These carboxylic acid derivatives having an ethylenic double bond can be used alone or in combination.

The hot-melt adhesive for electric instruments of the present invention may further contain various additives, optionally. Examples of the various additives include a wax, a tackifier resin, a plasticizer, a stabilizer (an ultraviolet absorber and an antioxidant), and a fine particle filler.

The "wax" may be a wax which is usually used in a hot-melt adhesive, and specific examples thereof include a paraffin wax, a polyethylene wax, a polyethylene oxide wax, a polypropylene wax, a microcrystalline wax, and a Fischer-Tropsch wax.

There is no particular limitation on the "tackifier resin" as long as it is usually used in a hot-melt adhesive and the objective hot-melt adhesive of the present invention can be obtained.

Examples of the tackifier resin include, a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, a hydrogenated derivative of a copolymer of a hydrogenated terpene, a polyterpene resin, a hydrogenated derivative of a phenol based modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cyclic aliphatic petroleum hydrocarbon resin, and a hydrogenated derivative of a cyclic aliphatic petroleum hydrocarbon resin. These tackifier resins can be used alone or in combination. A liquid type tackifier resin can also be used as long as it has a colorless to pale yellow color tone and is substantially free from odor, and also has satisfactory thermal stability. Taking these characteristics into consideration comprehensively, hydrogenated derivatives of the above-mentioned resins are preferable as the tackifier resin.

Commercially available products can be used as the tackifier resin. Examples of the comercially available products include ECR5600 (trade name) manufactured by Exxon Mobil Corporation; MARUKACLEAR H (trade name) manufactured by Maruzen Petrochemical CO, LTD.; CLEARON K100 (trade name) manufactured by YASUHARA CHEMICAL CO., LTD.; ALKON M100 (trade name) manufactured by Arakawa Chemical Industries, Ltd.; I-MARV 5100 (trade name), I-MARV Y135 (trade name) and I-MARV P125 (trade name) manufactured by Idemitsu Petroleum Chemical Co., Ltd.; CLEARON K4090 (trade name) and CLEARON K4100 manufactured by YASUHARA CHEMICAL CO., LTD.; ECR231C (trade name)

and ECR179EX (trade name) manufactured by Exxon Mobil Corporation; and RIGARITE R7100 (trade name) and EASTCTAC C-100W (trade name) manufactured by Eastman Chemical Company. These comercially available tackifier resins can be used alone or in combination.

There is no particular limitation on the "plasticizer" as long as it is mixed for the purpose of decreasing melt viscosity of a hot-melt adhesive, imparting flexibility and improving wetting of an adherend, and also the objective hot-melt adhesive according to the present invention can be obtained. Examples of the plasticizer include paraffin based oil, naphthene based oil, and aromatic oil. Colorless and odorless paraffin based oil is particularly preferable.

Commercially available products can be used as the plasticizer. Examples thereof include White Oil Broom 350 (trade name) manufactured by Kukdong Oil & Chemical Co.; Ltd., Diana Frecia S32 (trade name), Diana Process Oil PW-90 (trade name) and DN Oil KP-68 (trade name) manufactured by Idemitsu Kosan Co., Ltd.; Enerper M1930 (trade name) manufactured by BP Chemicals Ltd.; and Kaydol (trade name) manufactured by Crompton Corporation. These plasticizers can be used alone or in combination.

The "stabilizer" is mixed so as to improve stability of a hot-melt adhesive by preventing decrease in molecular weight due to heat, air and light, as well as the occurrence of gelation, coloration, and odor of the hot-melt adhesive. There is no particular limitation on the stabilizer as long as the objective hot-melt adhesive of the present invention can be obtained. Examples of the stabilizer include an antioxidant and an ultraviolet absorber.

The "ultraviolet absorber" is used so as to improve light resistance of a hot-melt adhesive. The "antioxidant" is used so as to prevent oxidative degradation of a hot-melt adhesive. There is no particular limitation on the antioxidant and ultraviolet absorber as long as they are commonly used in a hot-melt adhesive and below-mentioned objective electric instruments can be obtained.

Examples of the "antioxidant" include a phenol based antioxidant, a sulfur based antioxidant, and a phosphorus based antioxidant. Examples of the ultraviolet absorber include a benzotriazole based ultraviolet absorber and a benzophenone based ultraviolet absorber. A lactone based stabilizer can also be added. These antioxidants and ultraviolet absorbers can be used alone or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co., Ltd.; IRGANOX 1010 (trade name), IRGANOX HP2225FF (trade name), IRGAFOS 168 (trade name) and IRGANOX 1520 (trade name) manufactured by BASF Corporation; ADK STAB AO-60 (trade name) manufactured by ADEKA Corporation; and JF77 (trade name) and JP-650 (trade name) manufactured by Johoku Chemical Co., Ltd. These stabilizers can be used alone or in combination.

The hot-melt adhesive of the present invention can further contain a fine particle filler. There is no particular limitation on the fine particle filler as long as it is commonly used and the objective hot-melt adhesive of the present invention can be obtained. Examples of the "fine particle filler" include mica, calcium carbonate, kaolin, talc, titanium oxide, diatomaceous earth, urea based resin, styrene beads, baked clay, and starch. The shape of these fine particle fillers is preferably spherical. There is no particular limitation on the size (diameter in case of a spherical shape).

The hot-melt adhesive for electric instruments can be produced by known technology. Typically, the hot-melt adhesive is produced by melting an olefin based modified polymer (A) at a temperature of about 100 to 200° C. and optionally adding a polyolefin (B), followed by mixing for 0.5 to 2 hours until the mixture becomes homogeneous. There is no particular limitation on the mixing method. Various additives such as a wax, a tackifier resin, an antioxidant, and/or a plasticizer are optionally preferably mixed together when the component (A) is melted, and may be added after melting the component (A).

The hot-melt adhesive for electric instruments of the present invention can take various shapes and is commonly in a block shape or a film-like (sheet-like) shape at normal temperature. The block-shaped hot-melt adhesive is obtained by solidifying the product which is obtained by the above production method with cooling, while the film (sheet)-shaped hot-melt adhesive is obtained by further forming the product obtained by the above production method into a film shape. The forming method includes, for example, a method in which a drum cooler and a T-die type twin-screw extruder are used.

The hot-melt adhesive for electric instruments of the present invention is applied on members of the electric instruments, for example, an electrode, and a packing material containing an electrolytic solution therein (plastic film such as a polyimide film). It is particularly preferably applied on a packing material (polyimide film). It is also environmentally friendly that it is not necessary to mix an organic solvent in the hot-melt adhesive for electric instruments when it is applied on the members of the electric instruments.

There is no particular limitation on the coating method, and a commonly well-known method for applying (coating) a hot-melt adhesive can be used. The coating method is, for example, roughly classified into contact coating and non-contact coating methods. The "contact coating" method refers to an application method in which a dispenser is brought into contact with an electrode and/or a separator in the case of applying a hot-melt adhesive, whereas, the "non-contact coating" method refers to an application method in which a dispenser is not brought into contact with a base material and a sheet (film) in the case of applying a hot-melt adhesive. Examples of the "contact coating method" include a slot coater coating method and a roll coater coating method. Examples of the "non-contact coating method" include a spiral coating method capable of spiral coating; omega coating and control seam coating methods capable of wavy coating; slot spray coating and curtain spray coating methods capable of planar coating; and a dot coating method capable of spot-like coating.

Taking coatability of the hot-melt adhesive for electric instruments according to the present invention into consideration, a softening point thereof is preferably from 100 to 200° C., more preferably from 100 to 170° C., and most preferably from 120 to 170° C.

The softening point means the value measured by a ring and ball method (method disclosed in Japan Adhesive Industry standards JAI-7-1999).

Melt viscosity at 190° C. of the hot melt adhesive for electric instruments is preferably from 5,000 to 100,000 mPa·s, more preferably from 10,000 to 70,000 mPa·s, particularly preferably from 15,000 to 60,000 mPa·s, and most preferably from 20,000 to 60,000 mPa·s.

The melt viscosity is regarded as the value which is obtained by measuring a viscosity of an appropriate amount of a hot-melt adhesive molten with heating to 190° C., using a spindle No. 27 in a Brookfield type viscometer.

In the present invention, the "electric instrument" means an instrument which converts the other energy into electric energy (electricity), an instrument which converts electric energy into the other energy, and an instrument which stores electric energy as electric energy or the other energy. There is no particular limitation on the electric instrument as long as it is produced by using the hot-melt adhesive according to the present invention.

The "instrument which converts the other energy into electric energy (electricity)" includes, for example, a generator (which converts mechanical energy into electric energy), a solar battery (which converts light energy into electric energy), and a fuel battery and a primary battery (which convert chemical energy into electric energy).

The "instrument which converts electric energy into the other energy" includes, for example, a motor (which converts electric energy into mechanical energy), an electric range (which converts electric energy into heat energy), and a light source (which converts electric energy into light energy).

The "instrument which stores electric energy as electric energy or the other energy" includes, for example, a secondary battery (storage battery), a condenser (or capacitor) (electrolytic condenser (or capacitor), electric double-layer condenser (or capacitor)), and a capacitor (electric double-layer capacitor).

The electric instrument according to the present invention is preferably an "instrument which converts the other energy into electric energy (electricity)" and an "instrument which stores electric energy as electric energy or the other energy", and more preferably a primary battery, a secondary battery, a fuel battery, a solar battery, a condenser, and a capacitor. These more preferred electric instruments can also be classified into a chemical battery and a physical battery.

Examples of the Chemical Battery Include:
(1) primary batteries such as a manganese battery, an alkali manganese battery, a silver oxide battery, and a mercury battery;
(2) secondary batteries such as a lithium battery, a lead storage battery, a nickel-cadmium storage battery, a nickel-hydrogen storage battery, a nickel-zinc storage battery, a silver oxide-zinc storage battery, a lithium ion battery, a lithium polymer battery, a zinc-air storage battery, an iron-air storage battery, and an aluminum-air storage battery; and
(3) fuel batteries.

Examples of the physical battery include a solar battery, an electrolytic capacitor, an electric double-layer capacitor, and a lithium ion capacitor.

The electric instrument according to the present invention, more specifically, a chemical battery and a physical battery can be obtained, for example, by coating an electrode, and a packing material (plastic film such as a polyimide film) containing therein with a hot-melt adhesive for electric instruments of the present invention. Taking the environmental problems in the future into consideration, preferred is an instrument which stores electric energy as electric energy or the other energy, specifically a secondary battery, an electrolytic capacitor, an electric double-layer capacitor, and a lithium ion capacitor. Limiting to the automobile field, a lithium ion battery, an electric double-layer capacitor, and a lithium ion capacitor are promising instruments as the electric instrument of the present invention.

In the present invention, an electric instrument is produced by laminating electrodes coated with a hot-melt adhesive of the present invention, and packing materials containing an electrolytic solution therein, and incorporating the obtained laminate as a component. As described previously, the hot-melt adhesive for electric instruments of the present invention is excellent in solvent resistance to an electrolytic solution and is excellent in adhesion to an adherend (particularly, polyimide).

Main embodiments of the present invention are shown below.
1. A hot-melt adhesive for electric instruments, comprising an olefin based modified polymer (A), wherein the olefin based modified polymer (A) has a functional group containing silicon.
2. The hot-melt adhesive for electric instruments according to the above 1, wherein the olefin based modified polymer (A) has an alkoxysilyl group.
3. The hot-melt adhesive for electric instruments according to the above 1 or 2, wherein the olefin based modified polymer (A) includes a modified polymer based on a copolymer of ethylene with the other olefin.
4. The hot-melt adhesive for electric instruments according to any one of the above 1 to 3, which further comprises a polyolefin (B).
5. An electric instrument obtainable by using the hot-melt adhesive according to any one of the above 1 to 4.

EXAMPLES

The present invention will be described in detail by way of Examples and Comparative Examples, but these Examples are for illustrative purposes only and are not to be construed restrictively.

Components used to produce hot-melt adhesives for electric instruments are shown below.

(A) Olefin Based Modified Polymer
(A1) Silane modified amorphous poly-α-olefin (ethylene-propylene-butene copolymer) (glass transition temperature: −29° C., softening point: 100° C., melt viscosity at 190° C.: 12,000 mPa·s, VESTOPLAST EP2412 (trade name) manufactured by Evonik Degussa Corporation)
(A2) Silane modified polyisobutylene (melt viscosity at 190° C.: 170 mPa·s, EPION EP100S (trade name) manufactured by Kaneka Corporation)
(A'3) Ethylene-vinyl acetate copolymer (vinyl acetate content: 28% by weight, melt viscosity at 190° C.: 23,000 mPa·s, ULTRASEN 722 (trade name) manufactured by TOSOH CORPORATION)
(A'4) Copolymer of ethylene with propylene and 1-butene (glass transition temperature: −28° C., softening point: 124° C., melt viscosity at 190° C.: 8,000 mPa·s, VESTOPLAST 708 (trade name) manufactured by Evonik Degussa Corporation)
(A'5) Acrylic resin (DIANAL BR113 (trade name) manufactured by MITSUBISHI RAYON CO., LTD.)
(A'6) Ethylene-methyl methacrylate copolymer (methyl methacrylate content: 28% by weight, melt viscosity at 190° C.: 1,900 mPa·s, ACRYFT CM5021 (trade name) manufactured by Sumitomo Chemical Co., Ltd.)
(A'7) Ethylene-glycidyl methacrylate copolymer (glycidyl methacrylate content: 19% by weight, melt viscosity at 190° C.: 33,000 mPa·s, BONDFAST CG5001 (trade name) manufactured by Sumitomo Chemical Co., Ltd.)

(A'8) Silane modified polypropylene glycol (silyl-terminated polyether resin) (melt viscosity at 190° C.: 200 mPa·s, MS polymer 5303 (trade name) manufactured by Kaneka Corporation)
(B) Polyolefin
(B1) Polypropylene base elastomer (melt viscosity at 190° C.: 1,200,000 mPa·s, Vistamaxx 6202 (trade name) manufactured by Exxon Mobil Corporation)
(B2) Ethylene/octene block polymer (melt viscosity at 190° C.: 750,000 mPa·s, Infuse 9817 (trade name) manufactured by The Dow Chemical Company)
(B3) Polypropylene (melt viscosity at 190° C.: 800,000 mPa·s, PM490M (trade name) manufactured by SunAllomer Ltd.)
(C) Wax
(C1) Crystalline propylene-ethylene wax (melt viscosity at 190° C.: 3,600 mPa·s, LICOCENE PP2602 (trade name) manufactured by Clariant Corporation)
(C2) Crystalline polypropylene wax (number average molecular weight: 4,000, softening point: 150° C., penetration: 1 or less, melt viscosity at 190° C.: 140 mPa·s, melting point: 140° C., Hi-WAX NP105 (trade name) manufactured by Mitsui Chemicals, Inc.)
(D) Tackifier Resin
(D1) Cyclic aliphatic petroleum resin (number average molecular weight: 1,900, softening point: 100° C., melt viscosity at 190° C.: 200 mPa·s, EASTOTAC C-100W (trade name) manufactured by Eastman Chemical Company)

These components were added in the proportions (parts by weight) shown in Tables 1 and 2. Using a universal stirrer, the respective components were melted and mixed at about 170° C. over about 1 hour to produce hot-melt adhesives of Examples 1 to 9, and Comparative Examples 1 to 6.

Adhesion was evaluated with respect to each of the hot-melt adhesives.

(Production of Samples)

Using a heated roller, each hot-melt adhesive was rolled to obtain a hot-melt sheet having a thickness of 30 μm. The obtained hot-melt sheet was interposed between two adherends of 5 can square, followed by pressing and heating using a hot press adjusted to a temperature of 120° C. and a pressure of 0.3 MPa for 3.5 minutes to obtain a laminate. After cooling, the laminate was cut into pieces of 1 cm in width to obtain samples. A treated polyimide film (thickness: 25 μm), a surface of which is treated with a silane coupling agent having an amino group, was used as the adherend.

(Evaluation of Adhesion)

<Before Immersion in Solvent: Adhesion to Adherend>

The sample thus produced was allowed to undergo T-peeling at a speed of 50 mm/minute under an atmosphere of 20 to 25° C., and then a state of the peeled surface was visually confirmed.

<After Immersion in Solvent: Solvent Resistance>

The specimens thus produced (samples cut into pieces of 1 cm in width) was immersed in diethyl carbonate and then stored at 45° C. After sufficiently wiping away diethyl carbonate attached to the specimen taken out after 1 day and the specimen taken out after 5 days, using a paper waste, each specimen was allowed to undergo T-peeling at a speed of 50 mm/minute, and then a state of each the peeled surface was visually confirmed.

Evaluation criteria are as follows.

A: A hot-melt adhesive was satisfactorily adhered to an adherend, and a cohesive fracture of the hot-melt adhesive was recognized B: Although a hot-melt adhesive was satisfactorily adhered to an adherend, bonded interfacial fracture was recognized between the hot-melt adhesive and the adherend.

C: Although a hot-melt adhesive was satisfactorily adhered to an adherend, peeling easily occurred.

D: A hot-melt adhesive was not adhered to an adherend.

TABLE 1

| | Examples | | | | | | | | |
|---|---|---|---|---|---|---|---|---|---|
| | 1 | 2 | 3 | 4 | 5 | 6 | 7 | 8 | 9 |
| (A1) | 25 | 15 | 50 | 25 | 25 | 25 | 25 | — | 50 |
| (A2) | — | — | — | — | — | — | — | 25 | — |
| (A' 3) | — | — | — | — | — | — | — | — | — |
| (A' 4) | — | — | — | — | — | — | — | — | — |
| (A' 5) | — | — | — | — | — | — | — | — | — |
| (A' 6) | — | — | — | — | — | — | — | — | — |
| (A' 7) | — | — | — | — | — | — | — | — | — |
| (A' 8) | — | — | — | — | — | — | — | — | — |
| (B1) | 25 | 25 | 25 | 15 | 50 | — | — | 25 | — |
| (B2) | — | — | — | — | — | 25 | — | — | — |
| (B3) | — | — | — | — | — | — | 25 | — | — |
| (C1) | 25 | 25 | — | 25 | — | 25 | 25 | 25 | 25 |
| (C2) | 15 | 20 | 15 | 25 | 15 | 15 | 15 | 15 | 15 |
| (D1) | 10 | 15 | 10 | 10 | 10 | 10 | 10 | 10 | 10 |
| Total of (A) to (D) | 100 | 100 | 100 | 100 | 100 | 100 | 100 | 100 | 100 |
| Adhesion (before immersion) | A | B | A | A | B | B | B | B | B |
| Adhesion (immersed in solvent for 1 day) | A | B | A | A | B | B | B | C | B |
| Adhesion (immersed in solvent for 5 days) | A | B | A | A | B | B | B | C | B |

TABLE 2

| | Comparative Examples | | | | | |
|---|---|---|---|---|---|---|
| | 1 | 2 | 3 | 4 | 5 | 6 |
| (A1) | — | — | — | — | — | — |
| (A2) | — | — | — | — | — | — |
| (A' 3) | 25 | — | — | — | — | — |
| (A' 4) | — | 25 | — | — | — | — |
| (A' 5) | — | — | 25 | — | — | — |
| (A' 6) | — | — | — | 25 | — | — |
| (A' 7) | — | — | — | — | 25 | — |
| (A' 8) | — | — | — | — | — | 25 |
| (B1) | 25 | 25 | 25 | 25 | 25 | 25 |
| (B2) | — | — | — | — | — | — |
| (B3) | — | — | — | — | — | — |
| (C1) | 25 | 25 | 25 | 25 | 25 | 25 |
| (C2) | 15 | 15 | 15 | 15 | 15 | 15 |
| (D1) | 10 | 10 | 10 | 10 | 10 | 10 |
| Total of (A) to (D) | 100 | 100 | 100 | 100 | 100 | 100 |
| Adhesion (before immersion) | C | C | D | C | C | D |
| Adhesion (immersed in solvent for 1 day) | D | D | D | D | D | D |
| Adhesion (immersed in solvent for 5 days) | D | D | D | D | D | D |

As shown in Table 1, the hot-melt adhesives of Examples 1 to 9 are excellent in adhesion to an adherend and do not cause deterioration of adhesion even though immersed in a solvent, and are also excellent in solvent resistance since the hot-melt adhesives contain an olefin based modified polymer having a silicon-containing functional group (A).

It was demonstrated that the hot-melt adhesives of Examples 1 to 9 are effective as electric instrument applications, particularly an adhesive for sealing a packing material of a lithium ion battery since the hot-melt adhesives are excellent in adhesion to a polyimide film and do not cause deterioration of adhesion even though immersed in an electrolytic solution.

In contrast, as shown in Table 2, the hot-melt adhesives of Comparative Examples 1 to 5 exhibit low adhesion since the hot-melt adhesives contain no olefin based modified polymer W. Particularly, the hot-melt adhesives are drastically inferior in adhesion after immersion in a solvent. The hot-melt adhesive of Comparative Example 6 exhibits drastically low adhesion to an adherend, and solvent resistance since the hot-melt adhesive contains a modified polymer having a silicon-containing functional group imparted thereto (A'8), but a base polymer of the modified polymer (A'8) is not a polyolefin.

INDUSTRIAL APPLICABILITY

The present invention provides a hot-melt adhesive for electric instruments. The hot-melt adhesive for electric instruments according to the present invention is particularly useful for sealing a packing material for an electrolytic solution of a lithium ion battery.

DESCRIPTION OF REFERENCE NUMERALS

A: Hot-melt adhesive
20: Electrolytic solution
30: Adherend

The invention claimed is:

1. An electric instrument comprising a container, wherein the container comprises (1) an adherend made of a resin film, (2) an electrolytic solution inside the adherend, and (3) a hot-melt adhesive sealing the adherend together,
   wherein the hot-melt adhesive comprises an olefin based modified polymer (A) that has a functional group containing silicon,
   wherein the hot-melt adhesive is in direct contact with the electrolytic solution and prevents the electrolytic solution from leaking from the container.

2. The electric instrument of claim 1, wherein the olefin based modified polymer (A) has an alkoxysilyl group.

3. The electric instrument of claim 1, wherein the olefin based modified polymer (A) is an ethylene copolymer with a comonomer olefin.

4. The electric instrument of claim 1, which further comprises a polyolefin (B).

5. The electric instrument of claim 2, wherein the alkoxysilyl group is selected from the group consisting of trimethoxysilyl group, triethoxysilyl group, and dimethoxymethylsilyl group.

6. The electric instrument of claim 3, wherein the comonomer olefin is selected from the group consisting of propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2, 3-dimethyl-2-butene.

7. The electric instrument of claim 5, wherein the comonomer is selected from the group consisting of propylene, butene, and octene.

8. The electric instrument of claim 1, which is a primary battery, secondary battery, fuel battery, solar battery, condenser or capacitor.

* * * * *

UNITED STATES PATENT AND TRADEMARK OFFICE
CERTIFICATE OF CORRECTION

PATENT NO. : 9,550,922 B2
APPLICATION NO. : 14/523359
DATED : January 24, 2017
INVENTOR(S) : Itsuro Tomatsu, Kenji Matsuda and Ai Takamori It is certified that error appears in the above-identified patent and that said Letters Patent is hereby corrected as shown below:

In the Specification

Column 5, Line 12: Change "conuercially" to -- commercially --.

Column 6, Line 56: Change "comercially" to -- commercially --.

Column 6, Line 63: Change "5100" to -- S100 --.

Column 7, Line 3: Change "EASTCTAC C-100W" to -- EASTOTAC C-100W --.

Column 7, Line 4: Change "comercially" to -- commercially --.

Column 11, Line 3: Change "5303" to -- S303 --.

Column 11, Line 42: Change "5 can" to -- 5 cm --.

Column 13, Line 7: Change "W" to -- (A) --.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*